United States Patent [19]

Kolz

[11] Patent Number: 5,804,065
[45] Date of Patent: Sep. 8, 1998

[54] CONTROL APPARATUS FOR MARINE ANIMALS

[75] Inventor: Arvin L. Kolz, Lakewood, Colo.

[73] Assignee: The United States of America as represented by the Secretary of Agriculture, Washington, D.C.

[21] Appl. No.: 560,385

[22] Filed: Nov. 17, 1995

[51] Int. Cl.[6] ....................................... C02F 1/48
[52] U.S. Cl. ..................... 210/170; 210/747; 210/748; 204/286; 205/705; 134/1; 134/166 R
[58] Field of Search ..................... 210/747, 764, 210/170, 748; 204/272, 286; 205/668, 669, 705; 134/1, 166 R

[56] References Cited

U.S. PATENT DOCUMENTS

| | | |
|---|---|---|
| 3,753,886 | 8/1973 | Myers ................................. 204/186 |
| 4,457,221 | 7/1984 | Geren ................................. 99/451 |
| 5,148,777 | 9/1992 | Brodkhurst . |
| 5,202,638 | 4/1993 | Kolz . |
| 5,240,674 | 8/1993 | Armor . |
| 5,289,133 | 2/1994 | Kolz . |
| 5,294,351 | 3/1994 | Clum et al. . |
| 5,368,748 | 11/1994 | Sanderson . |
| 5,389,266 | 2/1995 | Clum et al. . |
| 5,417,820 | 5/1995 | Fears . |
| 5,432,756 | 7/1995 | Bryden . |
| 5,476,595 | 12/1995 | Baddour et al. ................... 210/748 |

*Primary Examiner*—Neil McCarthy

[57] ABSTRACT

Electric control apparatus generates electric fields in the water suitable for killing marine animals, particularly zebra mussels. These electric fields can be spatially controlled and designed to produce appropriate levels of power density to tetanize or kill zebra mussels while at the same time providing electrical isolation and protection for other marine animals in the surrounding habitat.

16 Claims, 2 Drawing Sheets

U.S. Patent  Sep. 8, 1998  Sheet 2 of 2  5,804,065
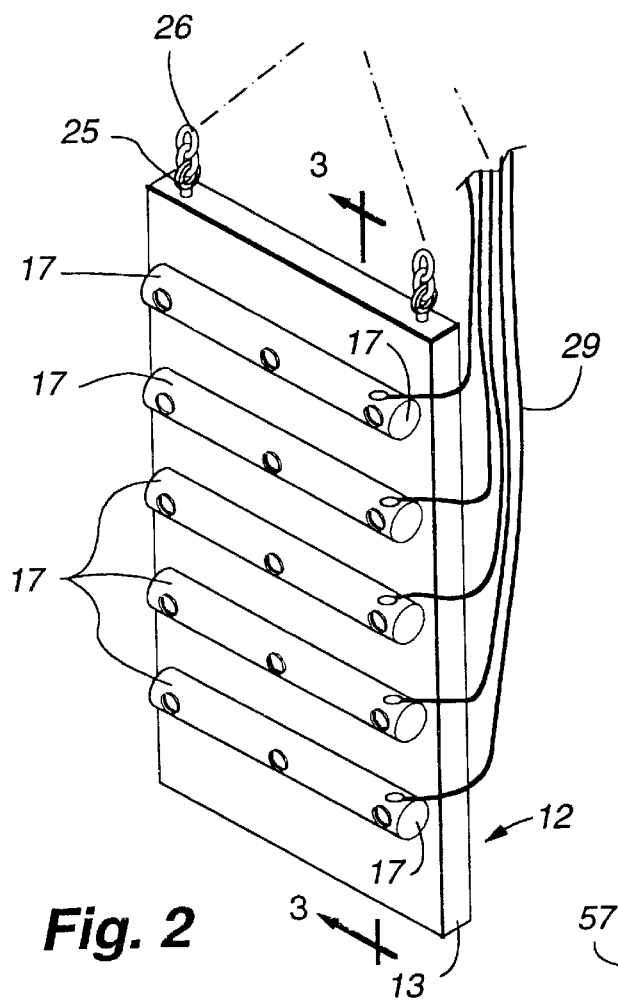
Fig. 2
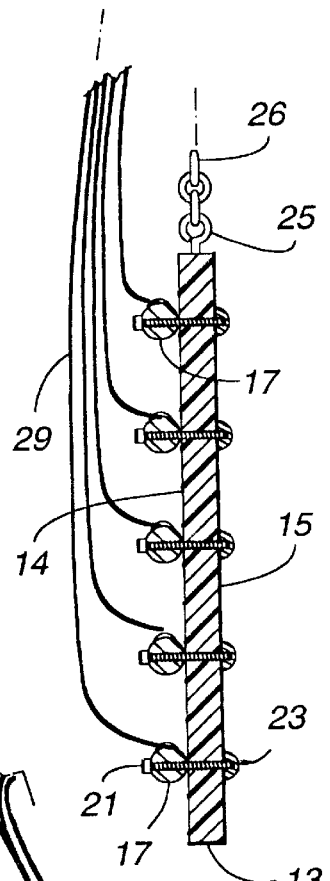
Fig. 3
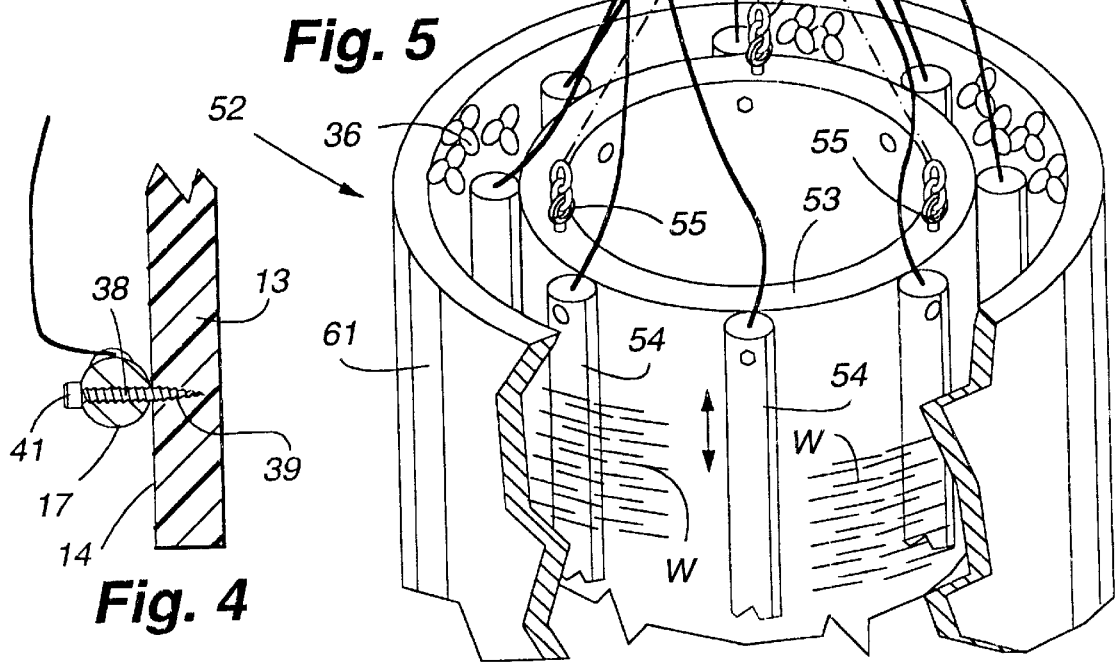
Fig. 5
Fig. 4

CONTROL APPARATUS FOR MARINE ANIMALS

TECHNICAL FIELD

This invention relates to electrical apparatus for controlling marine animals and is particularly suitable for killing concentrations of zebra mussels.

BACKGROUND ART

Zebra mussels (Dreissena polymorpha) have proliferated during the last nine years at an alarming rate after accidentally being introduced into the Great Lakes in 1986. There are no methods available to prevent the migration of these animals, and zebra mussels will soon inhabit the major waterways in the United States and parts of Canada. These mussels have already migrated through the Great Lakes, and are now reported in the Mississippi River, upper Chesapeake Bay, and Illinois river. The corrosion and fouling caused to under-water transport and stationary structures by these animals is predicted to create an environmental impact unprecedented in U.S. waterways. Federal agencies are rapidly initiating research and extending funding for the development of appropriate chemical and mechanical controls. At this time, some of the known effective controls involve the use of chlorine, heat, and physical removal.

V. A. Shentiakov in a publication entitled "*THE EFFECT OF INDUSTRIAL-FREQUENCY ELECTRIC CURRENT ON DREISSENA POLYMORPHA PALL COLONIES*" and M. Ia. Kirpichenko et al. in a publication entitled "*THE EFFECT OF BRIEF EXPOSURES TO ELECTRIC CURRENT ON LARVAL DREISSENA*" discuss the electroshocking effects on mollusks. These disclosures use voltage gradient as the significant electrical parameter, and neither disclose power transfer or the significance of electrical power density in applying an electric field to marine life in water.

Garry Smythe in a publication entitled "*REDUCING COSTLY ZEBRA MUSSEL INFESTATIONS AT POWER PLANTS*" discloses the results of high voltage testing with zebra mussels.

U.S. Pat. No. 5,368,748 discloses a magnetic core unit having end to end permanent magnets that produce a magnetic field sufficient to reduce the growth of zebra mussels.

U.S. Pat. No. 5,432,756 discloses the application of 5000 volts DC and an energy discharge of 25,000 amps to electrodes in a plasma sparking device to inhibit the build up of mussels.

U.S. Pat. Nos. 5,148,777, 5,240,674, 5,294,351 and 5,389,266 disclose the use of heat to control mussels.

U.S. Pat. No. 5,417,820 discloses the method of using two spaced electrodes and applying a voltage thereto to create a current flow path and an electrical field.

U.S. Pat. Nos. 5,202,638 and 5,289,133 having the same inventor as the subject application disclose the importance of power transfer and using power density in applying an electric field to a body of water containing marine animals.

DISCLOSURE OF INVENTION

Control apparatus for marine animals, particularly zebra mussels, disclosed includes a dielectric plate of flat or cylindrical configuration and a plurality of spaced electrodes are mounted on one face of the plate. Electric power is applied across adjacent pairs of electrodes to produce an electric field that impinges on the marine animals. The magnitude of the electrical power density and the electric conductivity of the marine animals in the water is used to determine the intensity of the shock necessary to kill the marine animals.

BRIEF DESCRIPTION OF THE DRAWINGS

Details of this invention are described in connection with the accompanying drawings which like parts bear similar reference numerals in which:

FIG. 2 is a perspective view of the control apparatus shown in FIG. 1.

FIG. 3 is a sectional view taken along line 3—3 of FIG. 2.

FIG. 4 is a fragmentary sectional view showing an alternative arrangement for mounting the electrodes to the dielectric plate.

FIG. 5 is top perspective view of an alternative embodiment using a hollow cylindrical support plate with circumferentially spaced electrodes inside a hollow pipe for conducting fluids.

DETAILED DESCRIPTION

Figure 1:
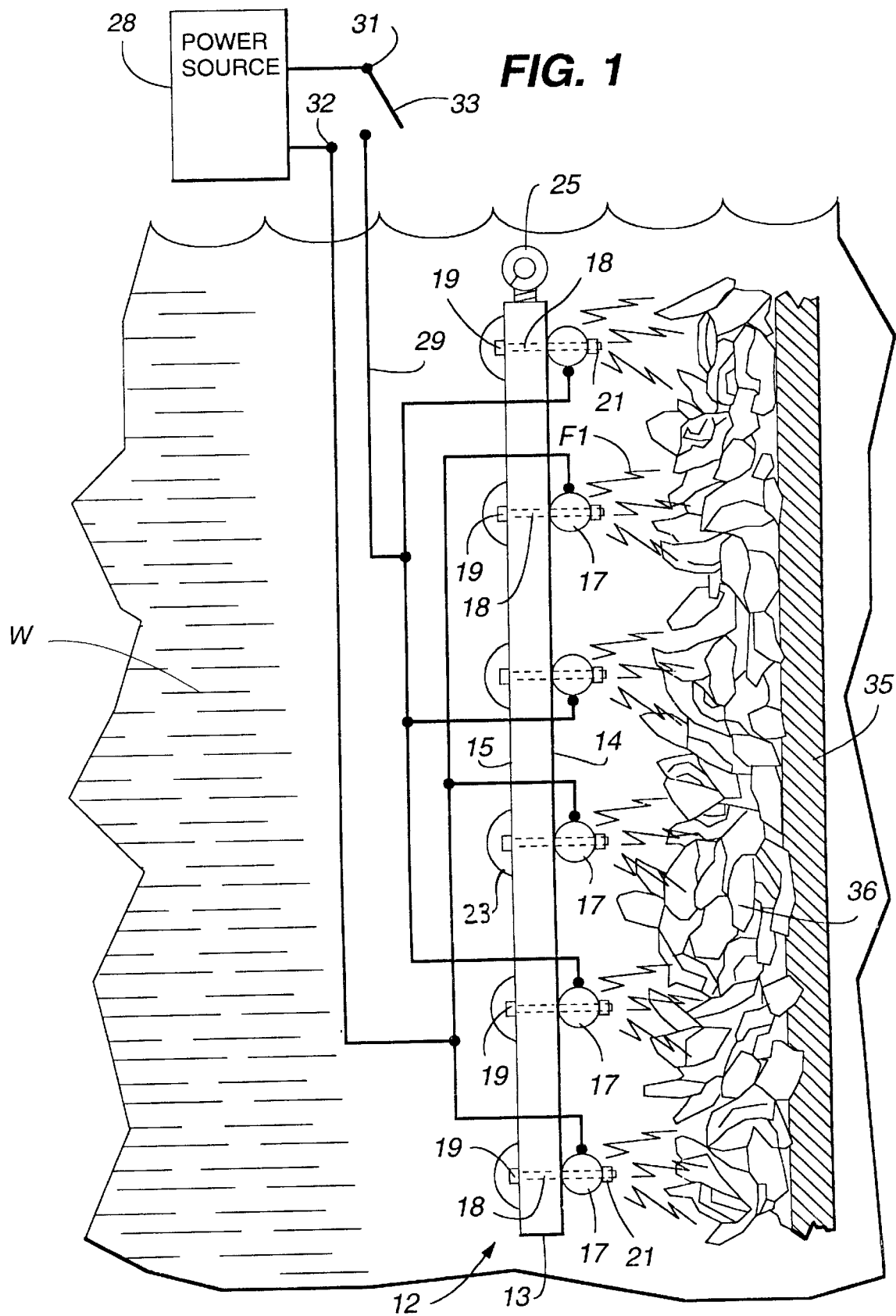
FIG. 1 is a side elevation view of a first embodiment of control apparatus for marine animals embodying features of the present invention arranged in a vertical position in a body of water alongside a vertical wall with marine animals to be treated.

Referring now to the drawings and in particular FIGS. 1–3 there is shown control apparatus 12 for marine animals embodying features of the present invention which comprises a flat dielectric plate 13 of a selected dimension having an inner face 14 and an outer face 15. A lexan dielectric material has been found suitable for plate 13 to block the electric field from harm to marine animals along the outer face 15. Six parallel spaced electrodes 17 are shown mounted to the plate 13 along the inner face 14. It is understood that the minimum number of electrodes that can be used according to the present invention is a pair across which the voltage is applied. The spacing between electrodes is spatially controlled in relation to one another to produce a selected field intensity. These electrodes 17 are of a selected length, are shown as having a circular cross-section and are shown as mounted by providing three spaced holes in the electrodes and corresponding holes in the plate 13. A bolt 18 extends through each of these holes and has a head 19 that bears against the outer face 15. A nut 21 threads on the bolt and bears against the electrode 17 which in turn bears against the inner face 14. A suitable cover member 23 in the form of a semi-circular body of dielectric material is formed over the head 19 of each bolt to prevent the electromagnetic field from passing through the plate along the bolt into the water along the outer face 15 of the plate. A pair of spaced eyebolts 25 are shown connected at one end and a dielectric chain or non-conductive rope 26 is shown connected to the eyebolts together with a suspended electrical cable serve as a means to suspend the plate 13 and electrodes 17 in a body of water W.

The electrical power source 28 is shown as having output terminals 31 and 32 connected to the electrodes 17 by conductive wires or lines 29 so the electric power is across every adjacent pair of electrodes. For example, proceeding from top to bottom as shown in FIG. 1, the uppermost electrode has the power from terminal 31 connected thereto and the next adjacent lower electrode has the power from terminal 32 connected thereto. The power at terminal 31 is connected to the third electrode and at terminal 32 to the fourth electrode. An electric power source for this connection is 120 volts, 60 Hz, sinusoidal AC. Other magnitudes and waveforms of AC and also DC or pulsed DC electric power of a selected voltage may be used. An electric switch 33 is shown connected in the line to turn the power to electrodes on and off. While the plate is shown disposed upright it is understood the apparatus may operate in a horizontal or any other angular orientation.

The plate 13 and electrodes 17 of the control apparatus 12 is shown in FIG. 1 as submerged in a body of water W in which there is a vertical wall 35 having marine animals 36 such as zebra mussels attached thereto. The vertical wall could be, for example, the wall of a dam or the surface of a water control structure. In operation, the plate 13 and electrodes 17 are lowered into the water and the electrodes 17 are positioned a selected distance from the marine animals 36. When the electric power from source 28 is applied to the electrodes, an electric field F1 is generated that is imparted or transmitted into and impinges on the marine animals 36 and produces electric shock in the marine animals. In practice the plate and electrodes will be moved slowly along the wall or structure killing the marine animals. The intensity of the electric shock induced in the marine animals is determined by the spacing between electrodes, the configuration and size of the electrodes, the magnitude of the electric power density present in the water, and the electric conductivity of the water. This power density is determined by using the apparatus and method disclosed in U.S. Pat. Nos. 5,202,638 and 5,289,133 the disclosures of which are incorporated herein by reference.

A modification for mounting the electrodes 17 shown in FIG. 4 has a bolt 38 extending through a hole in the electrode 17 and into a blind hole in plate 13. The bolt has external threads 39 threading into the dielectric plate 13 from the side of inner face 14 so that no cover member 23 is required. The head 41 of a bolt 38 is on the inner face 14 side of the plate.

Referring now to FIG. 5 there is shown an alternative embodiment in which there is control apparatus 52 including a hollow cylindrical plate 53 made of a dielectric material. There are shown eight circumferentially spaced electrodes 54 mounted on the plate 53 and suitably fastened such as by bolts in the same manner as shown in FIGS. 1–4. The plate has eyelets 55 secured to one end and suspension dielectric chains 56 attached thereto. A power line 57 connects to each electrode for supplying electric power thereto.

The control apparatus 52 is mounted inside a hollow conduit 61 through which a stream of fluid such as water W is passed. The conduit may be a relatively large water conduit or pipe and the marine animals 36 such as zebra mussels collects on the inside of the water conduit. This device operates the same as that shown in FIGS. 1–4 but is inside of the large conduit structure rather than in close proximity to a flat surface on which the marine animals are attached.

For the above described apparatus the dielectric plate can be readily configured or shaped to conform to the configuration of the surface supporting the marine animals herein referred to as an irregular surface. In addition it is understood that the electric field can be spatially controlled so as to impinge only on selected areas. This may be done by the manner in which the electrodes are wired or the characteristics of the voltage amplitude and waveform applied to the electrodes.

For both of the above described embodiments the power density applied is between about 3,500 to 50,000 microwatts/cubic centimeter for a time of between about 24 to 72 hours. In designing the apparatus the first step is to measure the temperature of the water and then determine the threshold of power density required to kill zebra mussels taken from a power density transfer curve similar to FIG. 5 of U.S. Pat. No. 5,202,638. The apparatus is then designed to produce the desired electric field. The required intensity of the electric field is determined by the spacing between electrodes, the voltage, the waveform, the size or the physical cross-sectional configuration of the electrodes. There is a greater field intensity produced at a given applied voltage by using smaller sized electrodes at a closer distance.

A suitable electric power is 120 volts AC, 60 Hz applied across each pair of electrodes. This energy produces electronarcosis and tetany to keep the animals in a state of electroshock till death. In operation typically the apparatus is moved at a slow rate along and in proximity to the animals attached to a surface. This may be done by a suitable cable, winch, etc.

Although the present invention has been described with a certain degree of particularity, it is understood that the present disclosure has been made by way of example and that changes in details of structure may be made without departing from the spirit thereof.

What is claimed is:

1. Control apparatus for marine animals comprising:
   a dielectric plate having an inner face and an outer face, means for submerging said dielectric plate in water having marine animals along both of said faces,
   at least a pair of spaced electrodes mounted to said plate along said inner face, said electrodes being spaced relative to one another to produce a selected electric field intensity,
   means for positioning said electrodes relative to selected marine animals to be treated adjacent said inner face for a selected time interval,
   an electric power source connected to said electrodes for applying a selected voltage across said pair of spaced electrodes to produce an electric field that impinges on and produces an electric shock in said selected marine animals producing electronarcosis or tetany and keeping said selected marine animals in a state of electroshock until death, the intensity of the electric shock being determined by the spacing between said electrodes, the spacing between electrodes and the marine animals, the size and configuration of said electrodes, the ratio of the effective conductivities of the marine animals to the conductivity of the water, the magnitude of the electrical power density present in the water, the percentage of power density transferred from the water into the selected marine animals, and the effective electrical conductivity of said selected marine animals,
   said plate blocking the electric field from passing beyond said outer face to the marine animals along the outer face thereby shielding said marine animals from harm.

2. Control apparatus as set forth in claim 1 wherein there are multiple pairs of cylindrical electrodes connected so that the power is applied to every adjacent pair of electrodes.

3. Control apparatus as set forth in claim 1 wherein said power density is between about 3,500 to 50,000 microwatts/cubic centimeter and said time interval between about 24 to 72 hours in water having an electrical conductivity of about 200 to 400 micro siemens/cm.

4. Control apparatus as set forth in claim 1 further comprising means for gradually moving said plate through the water.

5. Control apparatus as set forth in claim 1 wherein said electric power is about 120 volts AC, 60 Hz.

6. Control apparatus as set forth in claim 1 wherein said plate is flat.

7. Control apparatus as set forth in claim 1 wherein said plate is a hollow cylinder.

8. Control apparatus as set forth in claim 1 wherein said dielectric plate is configured to conform to the configuration of a surface supporting the marine animals.

9. Control apparatus as set forth in claim 1 including means for spatially controlling the electric field to impinge only on selected areas containing said marine animals.

10. Control apparatus as set forth in claim 1 including means attached to said plate to facilitate suspension of said plate from a supporting cable.

11. Control apparatus as set forth in claim 1 wherein said electrodes are of a cylindrical configuration.

12. Control apparatus as set forth in claim 1 wherein said electrodes are fastened to said plate by bolt fastening means including a bolt extending from said outer face through apertures in said plate and electrode with a head at the outer face side and a nut on the inner face side.

13. Control apparatus as set forth in claim 12 including cover means of a dielectric material over said head and secured to said outer face to prevent the electric field from passing beyond said outer face.

14. Control apparatus as set forth in claim 1 wherein said electrodes are fastened to said plate by bolt fastening means including a bolt extending from an inner face through a blind hole in said plate with a head at the inner face and external threads threading into said plate.

15. Control apparatus for zebra mussels comprising:

a flat dielectric plate having an inner face and an outer face submerged in water having marine animals along both of said faces, a plurality of pairs of parallel spaced electrodes mounted to said plate along said inner face, said electrodes being spaced relative to one another to produce a selected electric field intensity, means for positioning said electrodes relative to zebra mussels to be treated in proximity to said inner face, an electric power source connected to adjacent pairs of said electrodes for applying a selected voltage across said pairs of spaced electrodes to produce an electric field that impinges on and produces an electric shock in said zebra mussels, the intensity of the electric shock being determined by the spacing between said electrodes, the spacing between the electrodes and the zebra mussels, the size and configuration of said electrodes, the ratio of the effective conductivity of the zebra mussels to the conductivity of the water, the magnitude of the electrical power density present in the water surrounding the zebra mussels, the percentage of power density transferred from the water into the zebra mussels, and the effective electrical conductivity of said zebra mussels, said power density being between about 3,500 to 50,000 microwatts/cubic centimeter for a time interval of about 24 to 72 hours in water having an electrical conductivity of about 200 to 400 micro siemens/cm, said applied voltage being about 120 volts AC, 60 Hz, producing electronarcosis or tetany and keeping said zebra mussels in a state of electroshock until death, means for gradually moving said plate through the water along said zebra mussels, said plate blocking the electric field from passing beyond said outer face to the marine animals along the outer face thereby shielding said marine animals from harm.

16. Control apparatus for zebra mussels comprising:

a dielectric plate in the form of a hollow cylinder having an inner face and an outer face with water passing through said cylinder and having marine animals along both of said faces, a plurality of pairs of parallel spaced electrodes mounted to said plate along said outer face, said electrodes being spaced relative to one another to produce a selected electric field intensity, means for positioning said electrodes relative to zebra mussels that are attached on an inner surface of a pipe conducting water to be treated in proximity to said outer face, an electric power source connected to adjacent pairs of said electrodes for applying a selected voltage across said pairs of spaced electrodes to produce an electric field that impinges on and produces an electric shock in said zebra mussels, the intensity of the electric shock being determined by the spacing between said electrodes, the spacing between the electrodes and the zebra mussels, the size and configuration of said electrodes, the ratio of the effective conductivity of the zebra mussels to the conductivity of the water, the magnitude of the electrical power density present in the water surrounding the zebra mussels, the percentage of power density transferred from the water into the zebra mussels, and the effective electrical conductivity of said zebra mussels, said power density being between about 3,500 to 50,000 microwatts/cubic centimeter for a time interval of about 24 to 72 hours in water having an electrical conductivity of about 200 to 400 micro siemens/cm, said applied voltage being about 120 volts AC, 60 Hz, producing electronarcosis or tetany and keeping said zebra mussels in a state of electroshock until death, means for gradually moving said plate through the water along said zebra mussels, said plate blocking the electric field from passing beyond said outer face to the marine animals along the outer face thereby shielding said marine animals from harm.

* * * * *